A. BEURRIER.
PROPELLING MECHANISM FOR AERIAL APPARATUS.
APPLICATION FILED SEPT. 21, 1910.
1,048,932. Patented Dec. 31, 1912.
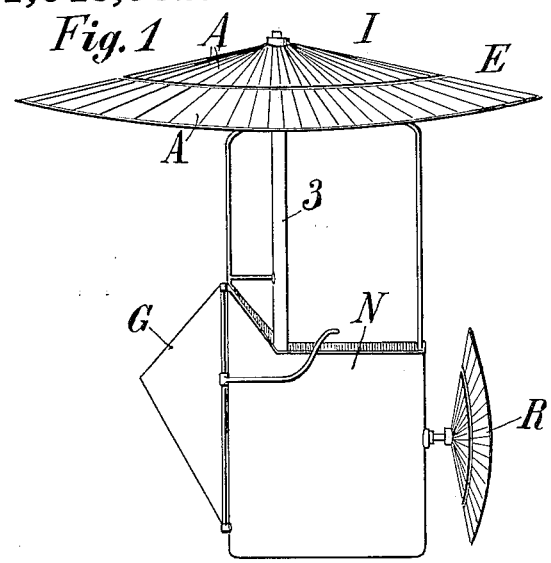
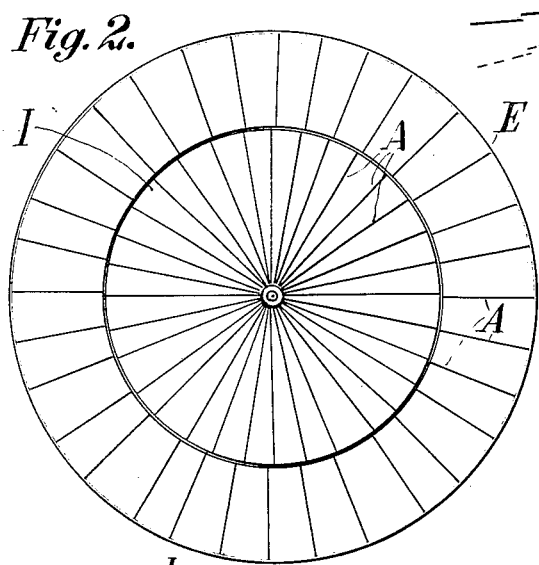
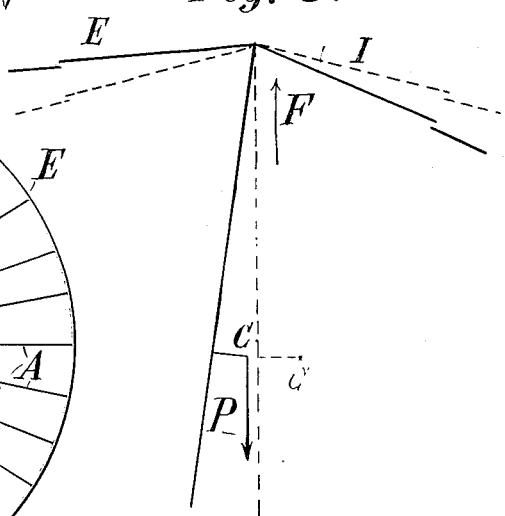
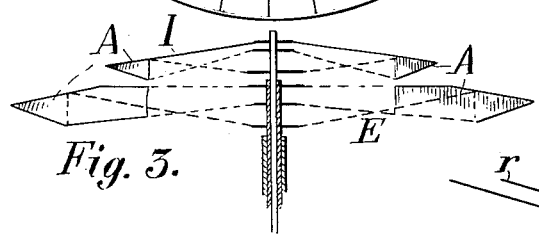
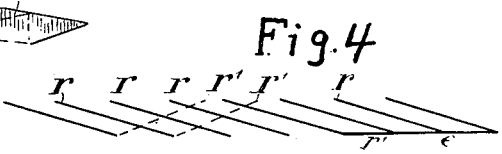

UNITED STATES PATENT OFFICE.

ALEXIS BEURRIER, OF MONTGUYON, FRANCE.

PROPELLING MECHANISM FOR AERIAL APPARATUS.

1,048,932.　　　　　　　　Specification of Letters Patent.　　Patented Dec. 31, 1912.

Application filed September 21, 1910. Serial No. 583,100.

*To all whom it may concern:*

Be it known that I, ALEXIS BEURRIER, a citizen of the Republic of France, residing at Montguyon, Charente-Inférieure, France, have invented certain new and useful Improvements in Propelling Mechanism for Aerial Apparatus, of which the following is a full, clear, and exact description.

My invention relates to new and useful improvements in concentrical circular wings with opposite motion for aerial apparatus, of which the following is a full, clear and exact description.

In the drawings, which form part of this specification, Figure 1 is an elevation of the invention adjusted for operation. Fig. 2 is a plan view of the same. Fig. 3 is an elevation in section of the upper part of the device. Figs. 4 and 5 are diagrammatic views of parts of the device.

As indicated by its name, this new flying machine is essentially composed of two large wheels or circular wings I and E inner and outer, moving on one same vertical axle, but in the opposite direction, each of these wings bears a large number of small wings or planes preferably of canvas, paper, calico, or aluminium.

All the small wings of each wheel rotate with the wheel, but each small wing A occupies an oblique position as regards the rotating plane, so that during its rotation, the small wings will form a series of oblique planes which will strike the air and tend to go up through resistance made by the air.

The general plane of the turning wings, is not absolutely perpendicular to the motor shaft, but forms with it an angle of about 85°.

To avoid the trouble which occurs through the helix turning in a fluid, when the body serving as a point of support is itself movable in this fluid, that is to say has a tendency to cause this body to turn in an opposite direction, oppositely rotating, circular wings or wheels are used.

In the circular concentrical wings with opposite motions, this trouble does not exist. The outer wheel turning for instance from right to left, all its small wings beat the air in this direction, repelling it in opposite direction, a little toward the center of the apparatus by reason of their obliqueness on the vertical axle; but the internal wings turning from left to right, all its small wings will strike the air in an oblique manner, and in the direction opposite to the current given by the external wing, so that the recoil movement is avoided, or rather compensated and utilized. The dimensions and the speed of rotation of the wings being calculated so as to balance the contrary resistances in the horizontal plane, and that resulting from the forces produced by the resistance of the air is represented by a vertical ascending movement.

The gear shaft being formed by concentrical tubes of steel, not shown, the motion given by the motor to one of them is transmitted to the other through a gearing changing the motion in the opposite direction.

With the circular wings, there is a series of oblique planes, arranged in Venetian, forming through their total arrangement, a large concave surface, a true bucket turned upside down, where the air is driven back and can escape but slowly, hence, the great yield and the utilization of the motor effort. When stopped, all these planes arranged in Venetians close like real automatic valves for forming a parachute where the air becomes engulfed and moderates the descent, and at the center of gravity is very low below the parachute, the turning upside down is impossible, and the apparatus may be carried away, but not upset.

Having thus fully described my invention what I claim is:

1. In a flying machine having a body and elevating wings thereon, a rotatable vertical dished wheel journaled in a side of said body, and, radial, automatically closable planes disposed at a small angle on said dished wheel.

2. A flying machine comprising a body frame, a vertical shaft on said frame, and a sleeve on said shaft, said shaft and said sleeve concentrically rotatable in opposite directions, a dished circular wheel rotated by said shaft, a larger dished circular wheel rotated by said sleeve, a vertical dished wheel journaled in a side of said body, radial, automatically closable planes disposed at a small angle in all of said wheels, said shaft and sleeve being adapted for rotation.

Signed in the presence of two witnesses.

ALEXIS BEURRIER.

Witnesses:
　EDOUARD BIGOURDAN,
　GEORGES VILLEBESSEYX.